United States Patent
Matsushita et al.

(10) Patent No.: US 9,555,506 B2
(45) Date of Patent: Jan. 31, 2017

(54) DRILL BLANK, METHOD FOR MANUFACTURING DRILL BLANK, DRILL, AND METHOD FOR MANUFACTURING DRILL

(71) Applicant: KYOCERA Corporation, Kyoto-shi, Kyoto (JP)

(72) Inventors: Shigeru Matsushita, Nagano (JP); Tadayuki Yamada, Shiojiri (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 97 days.

(21) Appl. No.: 14/380,389

(22) PCT Filed: Feb. 28, 2013

(86) PCT No.: PCT/JP2013/055453
§ 371 (c)(1),
(2) Date: Aug. 22, 2014

(87) PCT Pub. No.: WO2013/129586
PCT Pub. Date: Sep. 6, 2013

(65) Prior Publication Data
US 2015/0016908 A1  Jan. 15, 2015

(30) Foreign Application Priority Data
Feb. 28, 2012  (JP) .................. 2012-041735

(51) Int. Cl.
*B23P 15/32* (2006.01)
*B23K 1/00* (2006.01)
(Continued)

(52) U.S. Cl.
CPC .................. *B23P 15/32* (2013.01); *B22F 3/02* (2013.01); *B23B 51/02* (2013.01); *B23K 1/0008* (2013.01);
(Continued)

(58) Field of Classification Search
USPC .................................. 408/144; 428/212, 698
See application file for complete search history.

(56) References Cited

U.S. PATENT DOCUMENTS

| 4,761,262 A | 8/1988 | Ogata et al. |
| 5,716,170 A * | 2/1998 | Kammermeier ........ B23B 51/02 408/145 |

(Continued)

FOREIGN PATENT DOCUMENTS

| CN | 1689739 A | 11/2005 |
| JP | S61186404 A | 8/1986 |

(Continued)

OTHER PUBLICATIONS

Concise Explanation of the office action issued in the corresponding Chinese Patent Application No. 201380011185.X dated Oct. 30, 2015.

(Continued)

*Primary Examiner* — Archene Turner

(57) ABSTRACT

Provided are a drill blank, a method for manufacturing a blank, a drill, and a method for manufacturing a drill which allow a step of brazing to be easy and allow the brazing to be precise.

A drill includes a drill blank brazed thereto in an elongated columnar-shape and made of cemented carbide. In the drill blank, both $d_A$ and $d_B$ are equal to or smaller than 2 mm, $d_A \geq d_B > d_C$, a ratio of the length to $d_A$ is equal to or larger than 3, and $d_B/d_A = 0.96$ to 1 and $d_C/d_A = 0.9$ to 0.995 in a longitudinal direction, where $d_A$ indicates the diameter of one end of both ends, $d_B$ indicates the diameter of the other end thereof, and $d_C$ indicates the minimum diameter of a central portion. Brazing of the drill blank is easy and precision in brazing is enhanced.

4 Claims, 3 Drawing Sheets

(51) Int. Cl.
- B23K 1/005 (2006.01)
- B23K 31/02 (2006.01)
- B23B 51/02 (2006.01)
- B28B 3/02 (2006.01)
- C04B 35/56 (2006.01)
- C04B 35/64 (2006.01)
- B30B 15/02 (2006.01)
- B22F 3/02 (2006.01)
- C22C 29/08 (2006.01)
- B22F 7/06 (2006.01)
- B22F 5/00 (2006.01)

(52) U.S. Cl.
CPC .......... *B23K 1/0056* (2013.01); *B23K 31/025* (2013.01); *B28B 3/02* (2013.01); *B30B 15/022* (2013.01); *C04B 35/5626* (2013.01); *C04B 35/64* (2013.01); *B22F 7/062* (2013.01); *B22F 2005/001* (2013.01); *B22F 2005/004* (2013.01); *B23B 2222/28* (2013.01); *B23K 2201/20* (2013.01); *C22C 29/08* (2013.01); *Y10T 408/89* (2015.01)

(56) References Cited

U.S. PATENT DOCUMENTS 6,027,808 A * 2/2000 Aoki ........................ B22F 7/008
428/698

2005/0129951 A1 * 6/2005 Collin .................... C22C 1/051
428/698
2005/0147850 A1 * 7/2005 Tillman .................... B22F 7/06
428/698

FOREIGN PATENT DOCUMENTS

| JP | S6283447 A | 4/1987 |
| JP | H03174367 A | 7/1991 |
| JP | H08071824 A | 3/1996 |
| JP | 2003277807 A | 10/2003 |
| JP | 2004237375 A | 8/2004 |
| JP | 2007211259 A | 8/2007 |
| JP | 2010120144 A | 6/2010 |
| KR | 20-0365544 Y1 | 10/2004 |
| TW | M253424 U | 12/2004 |

OTHER PUBLICATIONS

International Search Report isseud in the corresponding the international application PCT/JP2013/055453 mailed on Jun. 11, 2013, 4 pages.
Concise Explanation of the office action issued in the corresponding Taiwan Patent Application No. 102107207 dated Nov. 23, 2015.
Office Action issued in the counterpart Korean patent application No. 10-2014-7021766 dated Sep. 21, 2016.

\* cited by examiner

DRILL BLANK, METHOD FOR MANUFACTURING DRILL BLANK, DRILL, AND METHOD FOR MANUFACTURING DRILL

RELATED APPLICATIONS

The present application is a national stage entry according to 35 U.S.C. §371 of PCT application No.: PCT/JP2013/055453 filed on Feb. 28, 2013, which claims priority from Japanese application No.: 2012-041735 filed on Feb. 28, 2012, and is incorporated herein by reference in its entirety.

TECHNICAL FIELD

The present invention relates to a blank for a drill to be used for drilling, a method for manufacturing a drill blank, a drill, and a method for manufacturing a drill.

BACKGROUND ART

As a drill to be used for drilling, there is known a solid drill having a flute groove formed from the cutting edge at the distal end, and which is adopted in drilling of a substrate on which electronic components are mounted, for example. Since a bore diameter to be processed becomes smaller in accordance with miniaturization of such electronic components, a drill having a smaller diameter is also required.

In order to manufacture such drill, as described in PTL 1, for example, a method is employed in which a blank is produced by cutting a molded body to have a predetermined length, which is molded into a fibrous shape through extrusion molding and by firing the molded body. Then, a step forming process, a flute groove forming process, and the like are performed on the blank to complete the drill. As a method for molding a blank, a press-molding method such as the method described in PTL 2 has been studied.

CITATION LIST

Patent Literature

PTL 1: Japanese Unexamined Patent Application Publication No. 2003-277807
PTL 2: Japanese Unexamined Patent Application Publication No. 2007-211259

SUMMARY OF INVENTION

Technical Problem

However, in the extrusion molding of PTL 1, a fibrous-shaped extrusion-molded body needs to be cut to have a predetermined length as described above. Moreover, a shape of the cut surface is crushed, and thus, there is a need to cut again, after performing firing, an end portion of a predetermined length from the cut surface of the extrusion-molded body after the cutting. In the extrusion molding, since there is a need to add a large amount of organic binder component when performing the molding, it is difficult to control carbon content in a sintered compact of cemented carbide, thereby easily causing defects such as a void, a carbon residue, and the like in the sintered compact.

According to the method in PTL 2, the pressurized molded body having a long and thin shape needs to be extruded by using a long and thin lower punch. However, when the diameter of the molded body is equal to or smaller than 2 mm, since an area in which a side surface of the molded body contacts with a die is wide, a load applied to the lower punch increases. Unevenness in filling density of powder which fills the inside of a powder filling portion of the die increases so that adhesion to the die locally becomes excessively high in the lowermost portion of the molded body. As a result, there is a problem in that the lower punch cannot withstand a load and may be easily damaged when drawing the molded body out from the inside of the die. Furthermore, uneven pressure in density of the molded body causes the shape of a blank to be in an hourglass shape, resulting in excessive deformation of the fired blank, and thus, there is a possibility that chipping or bending may occur in an end portion of the blank.

The shape of the molded body can be a tapered shape in order to suppress damage to the molded body in press-molding. However, there is a need to distinguish an upper punch side and a lower punch side of the blank and to align orientations of blanks depending on dimensions of the sintered compact in the tapered shape when brazing the blank to a shank. As a result, there are such problems as a disadvantage of a brazing process being complicated, and deviation of central axes between the shank and the blank not being parallel to each other, thereby causing an increase of a processing portion when grinding drill bit after brazing.

The present invention aims to provide a drill blank, a method for manufacturing a blank, a drill, and a method for manufacturing a drill which allow molding to be stable as well as brazing to be easy and precise.

Solution to Problem

A drill blank according to the present invention is in an elongated columnar-shape and is made of cemented carbide. Both $d_A$ and $d_B$ are equal to or smaller than 2 mm, $d_A \geq d_B > d_C$, a ratio of the length L to $d_A$ is equal to or larger than 3, and $d_B/d_A = 0.96$ to 1 and $d_C/d_A = 0.9$ to 0.995 in a longitudinal direction, where $d_A$ indicates the diameter of one end A of both ends, $d_B$ indicates the diameter of the other end B thereof, $d_C$ indicates the minimum diameter of a central portion C, and L indicates the length in the longitudinal direction.

A method for manufacturing a drill blank according to the present invention includes a step of producing particles of which an average diameter ranges from 100 µm to 150 µm and unevenness in size ranges from 60 µm to 100 µm by preparing base powder including WC powder; a step of producing a molded body by filling a cavity of a die of a press-molding die with the particles, causing an upper punch to be lowered from above and pressurizing the particles which fill the inside of the cavity of the die, adding an additional load onto the upper punch so as to cause a position of the upper punch to be lowered downward by 0.1 mm to 2 mm, and removing a load from a lower punch; and a step of firing the molded body.

A drill according to the present invention includes a drill blank that is brazed to a shank. Drill bit is grinded on the drill blank.

Another drill according to the present invention includes the cutting edge, and a processing section including a flute groove forming portion whose maximum diameter is equal to or smaller than 2 mm. An average diameter of WC grains in the cutting edge of the processing section is larger than an average diameter of the WC grains in a central portion of the processing section.

A method for manufacturing a drill according to the present invention includes a step of feeding a drill blank into a brazing apparatus, a step of aligning the drill blank in the brazing apparatus, a step of brazing the drill blank by causing the drill blank to contact with a shank, and a step of grinding drill bit on the drill blank.

Advantageous Effects of Invention

A drill blank according to the present invention includes one end A and the other end B having a small difference in dimensions therebetween, so that there is no need to distinguish the one end A and the other end B of a drill blank to be aligned when brazing the drill blank to a shank of a drill, and thus, the drill blank is easily brazed to the shank through highly precise brazing. Therefore, in a method for manufacturing a drill according to the present invention, workability throughout respective steps can be enhanced.

In a method for manufacturing a drill blank according to the present invention, the drill blank can be produced by adjusting a molded body which is not fired yet to have a density distribution allowing molding to be stable so as not to cause chipping or the like, and the drill blank after being fired conforms to a predetermined shape.

In a drill according to the present invention, an average diameter of WC grains of cemented carbide in the cutting edge is larger than an average diameter of the WC grains in a central portion of a processing section, and thus, the processing section has high rigidity and chipping-off in the cutting edge can be suppressed.

DESCRIPTION OF EMBODIMENTS

Figure 1:
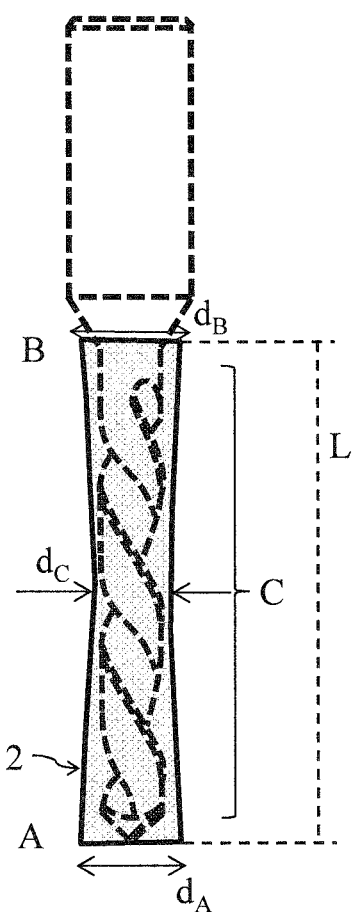
FIG. 1 is a side view of an example of a drill blank of the present invention.

An example of a drill in which a drill blank of the invention in FIG. 1 is brazed to a shank will be described with reference to a side view.

A drill blank (hereinafter, simply referred to as blank) 2 adopted in a drill 1 of FIG. 1 is in an elongated columnar-shape made of cemented carbide and is brazed to a shank 3. In the blank 2, both $d_A$ and $d_B$ are equal to or smaller than 2 mm, $d_A \geq d_B > d_C$, a ratio of the length L to $d_A$ is equal to or larger than 3, and $d_B/d_A = 0.96$ to 1 and $d_C/d_A = 0.9$ to 0.995 in a longitudinal direction, where $d_A$ indicates the diameter of one end A of both ends, $d_B$ indicates the diameter of the other end B thereof, $d_C$ indicates the minimum diameter of a central portion C, and L indicates the length in the longitudinal direction.

In the blank 2 having such a shape, a diameter of an end portion of the blank 2 is larger than a diameter of the central portion of the blank 2 so that an area for brazing is also wide and rigidity of the brazing is high as well. In the blank 2 having a ratio of $d_B/d_A = 0.96$ to 1, there is no need to align an orientation of the blank 2 in a brazing step in which the blank 2 is brazed to the shank 3, compared to a blank in a tapered shape having a ratio of $d_B/d_A$ smaller than 0.96. Therefore, the brazing step can be simplified. Moreover, the brazing is performed in a state where deviation of central axes between the blank 2 and the shank 3 is small, thereby making it possible to reduce a grinding portion when grinding drill bit after the brazing.

As suitable dimensions for the blank 2, $d_A$ and $d_B$ are each 0.3 mm to 1.7 mm, the length L is 3 mm to 20 mm, $d_B/d_A$ is 0.985 to 1, and $d_C/d_A$ is 0.980 to 0.995.

In the blank 2 according to the present embodiment, average diameters of WC grains on the one end A side and the other end B side are larger than an average diameter of the WC grains in the central portion C. Accordingly, it is possible to suppress chipping of the cutting edge 5 of the drill 1 which is formed by processing the blank 2 during the processing. Furthermore, a flute groove forming portion 6 has high rigidity, and thus, it is possible to suppress misalignment of the flute groove forming portion 6 when processing the cutting edge 5 of the drill 1 and to enhance precision in processing dimensions of the flute groove forming portion 6.

(Method for Manufacturing Blank)

An example of a method for manufacturing the drill blank will be described. First, base powder such as WC powder or the like is prepared for producing the cemented carbide which forms the blank and the drill, and slurry is produced by adding binder or a solvent to the base powder. The slurry is pelletized to be in particles, which is molding powder.

Meanwhile, a press-molding die (hereinafter, simply referred to as die) is prepared for filling a cavity of a die of the press-molding die with the particles. Then, the particles which fill the inside of the cavity of the die are pressurized by lowering an upper punch from above, thereby producing a molded body.

Regarding the conditions for producing the molded body, an average diameter of the particles is controlled to range from 100 μm to 150 μm, and unevenness in particle size is controlled to range from 60 μm to 100 μm. The unevenness in particle size is desirably controlled to be within a range from ±30 μm to ±50 μm with respect to the average diameter of the particles. The unevenness in particle size can be controlled by adjusting through sieve classification or the like. When performing molding, a lower punch is mounted at a predetermined position in the cavity, the inside of a concave portion surrounded by the lower punch and the cavity is filled with the particles from above, and the molded body is formed using the upper and lower punches by lowering the upper punch from above. Thereafter, an additional load is added onto the upper punch so as to cause a position of the upper punch to be lowered downward from a holding position of the upper punch at the time of pressurizing by 0.1 mm to 2 mm, and a load on the lower punch is reduced.

With the molding conditions, unevenness of pressure in the molded body can be reduced, and thus, damage to the lower punch can be suppressed when drawing out the molded body, and a shape of the blank 2 which is a fired molded body can conform to a predetermined shape. In other words, density of the molded body is in a state of being high in the one end a and the other end b, and low in the central portion c, and thus, regarding dimensions of a sintered compact after sintering is performed, the central portion c is more contracted as compared to the one end a and the other end b, whereby the ratio of $d_B/d_A$ is 0.96 to 1, and the ratio of $d_C/d_A$ is 0.9 to 0.995.

In other words, when producing the molded body through press-molding in order to obtain the sintered compact in a shape whose diameter is larger than 2 mm, the die is evenly filled with the particles when filling the die with the powder. However, when producing the molded body through press-molding in order to obtain the sintered compact whose diameter is equal to or smaller than 2 mm, a method in the related art causes the die to be unevenly filled with the particles when filling the die with the powder. According to the present invention, a molded body can be produced and a blank in a predetermined shape can be obtained by controlling the molding conditions.

Figure 2:
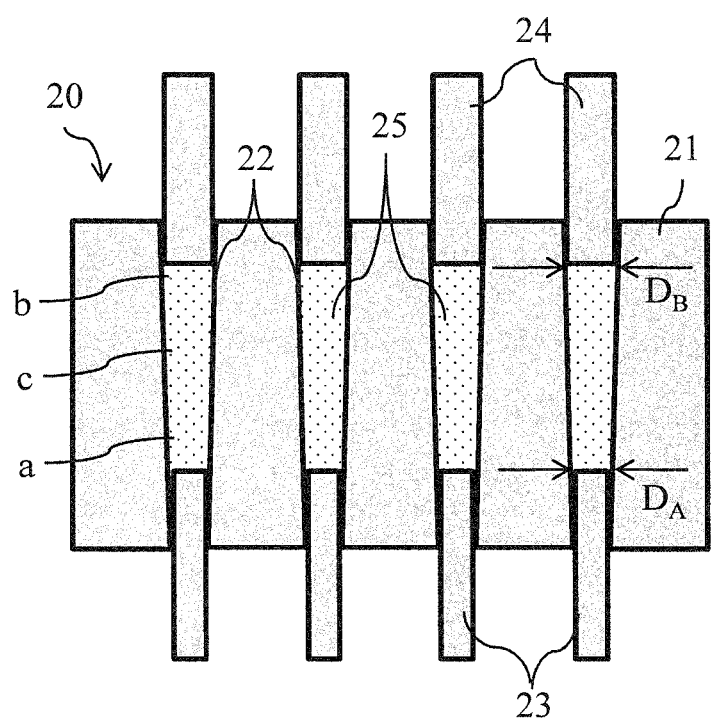
FIG. 2 is a schematic view describing a configuration of a die, regarding an example of a method for molding the drill blank of the present invention.

In order to enhance manufacturing efficiency and to prevent the upper punch from being obliquely lowered, a plurality of sets of upper punch-cavity-lower punch are provided in the die, and thus, a plurality of molded bodies can be molded at a time. The number of sets of upper punch-cavity-lower punch ranges from 4 to 144, for example. A shape on a side surface of the die may be in a straight shape having the same diameter from the upper punch to the lower punch. Otherwise, since contraction during firing is smaller on the lower punch side to which a pressure is easily applied than on the upper punch side, this fact is taken into consideration so as to be in a range where dimensions of the upper punch side and the lower punch side become identical to each other after the firing. Thus, as illustrated in FIG. 2, in a press-molding die 20 for performing press-molding by filling a powder filling portion (cavity) 22 of a die 21 with particles 25 and by pressurizing the particles 25 between an upper punch 24 and a lower punch 23, the diameter $D_A$ on the lower punch 23 side may be caused to be smaller than the diameter $D_B$ on the upper punch 24 side. Accordingly, the ratio of $d_B/d_A$ can be controlled within a predetermined range.

Then, the molded body is taken out from the die and fired at 1,300° C. to 1,500° C. in vacuo to be the blank 2. Moreover, a coating layer (not illustrated) can be deposited on the surface of the drill 1, if desired.

According to a method for manufacturing the blank 2 in the present embodiment described above, since the blank 2 is molded through press-molding, steps in the molding thereof are fewer than those in extrusion molding, and the blank 2 can easily be manufactured. There are fewer changes in dimensions of the blank 2 after firing the molded body of the blank 2, and thus high precision is achieved in dimensions of the blank 2. Therefore, the blank 2 can be formed in a shape requiring a smaller cutting portion with respect to the shape of the drill 1. Since an amount of addition of the binder during the molding can be reduced in the blank 2 which is formed through press-molding as compared to a blank formed through the extrusion molding, a highly reliable material can be obtained in which defects such as a void and a carbon residue are unlikely to exist in the sintered compact (blank 2). In the process of molding the blank 2, the molding in which chipping or the like is unlikely to occur can be stably performed by adjusting unevenness in density of the molded body.

In the manufacturing of the blank 2 of which $d_A$ is equal to or smaller than 2 mm, a difference in density of the molded body is caused by producing the molded body through press-molding. Accordingly, sintering of the cemented carbide tends to further proceed in the end portions (one end A and the other end B) of the blank 2 than in the central portion C. Therefore, in the present embodiment, a state of particles to be used during the molding is adjusted, damage to the die can be suppressed by adding an additional load using only the upper punch after pressurizing the particles using the upper and lower punches, and density of the molded body at both ends of the blank 2 can be adjusted. As a result, an average diameter of the WC grains in the cemented carbide which constitutes the fired blank 2 can be adjusted in the above-described manner.

(Method for Manufacturing Drill)

The blanks 2 obtained through the steps described above are randomly inserted into a brazing apparatus by the dozens or the hundreds. The blank 2 is aligned in the brazing apparatus in the longitudinal direction and is brought into contact with a predetermined position of a neck portion 7 extending from the shank 3 which is separately prepared. A laser or the like automatically brazes the blank 2 to the predetermined position. Thereafter, the drill bit is grinded on the brazed blank 2.

In this case, although FIG. 1 describes an embodiment where the one end A side is the cutting edge 5 side of the drill 1 and the other end B side is the shank 3 side of the drill 1, the present invention is not limited to the above-described embodiment. Since selection is randomly made in an aligning machine during the brazing, there may be a case where the one end A is the shank 3 side of the drill 1 and the other end B is the cutting edge 5 side of the drill 1.

(Drill)

Figure 3:
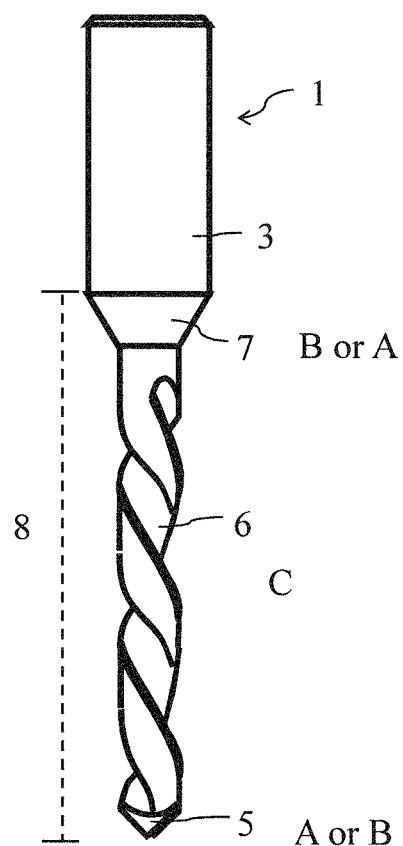
FIG. 3 is a side view of an example of a drill in which the drill blank in FIG. 1 is brazed to a shank and drill bit is grinded.

The drill 1 is produced through drill bit grinding of the blank 2. The shape of the drill 1 in FIG. 3 includes the cutting edge 5 on the one end A side, and a body 8 is configured to have the cutting edge 5, the flute groove forming portion 6 extending from the cutting edge 5, and the neck portion 7. The cutting edge 5 and the flute groove forming portion 6 form a processing section. The drill 1 has the shank 3 which is joined to the body 8. Here, the cutting edge 5 having a central axis and rotating around the same is a portion which first contacts with a material to be cut, and requires high chipping resistance and abrasion resistance. The flute groove forming portion 6 has a function of discharging chips rearward which are generated in the processing, and the neck portion 7 is a connection portion for adjusting a processing diameter (diameter of flute groove forming portion 6) of the drill 1 and a diameter of the shank 3. The shank 3 is a portion for fixing the drill 1 to a processing machine.

The drill obtained through the above-described method includes the processing section configured to have the cutting edge 5 formed of cemented carbide and the flute groove forming portion 6. The maximum diameter of the processing section is equal to or smaller than 2 mm.

In the drill 1 adopting the blank 2 of the present embodiment, the average diameter of the WC grains in the cutting edge 5 of the drill 1 is larger than the average diameter of the WC grains in the central portion C of the processing section. Therefore, the flute groove forming portion 6 has high rigidity, and chipping-off in the cutting edge 5 can be suppressed. In the present invention, the lengths of the one end A and the other end B are defined to be within 10% with respect to the whole length of the blank.

The neck portion 7 and the shank 3 can be formed with an inexpensive material such as steel, alloyed steel, or stainless steel, and the blank 2 can be brazed to the distal end of the neck portion 7. In such a configuration, the diameter of the blank 2 which is brazed to the distal end of the neck portion 7 can be larger than that on the cutting edge 5 side, so that the area for brazing becomes wide, and thus, brazing rigidity can be enhanced as well. A portion from the cutting edge 5 of the drill to the shank 3 may be formed of the blank. Further, the drill may have a shape in which the neck portion 7 is omitted.

EXAMPLES

Metallic cobalt (Co) powder: 0.6% by mass, chromium carbide ($Cr_3C_2$) powder: 6% by mass, and vanadium carbide (VC) powder: 0.3% by mass were blended with respect to tungsten carbide (WC) power having an average diameter of particles of 0.3 μm. Then, binder or a solvent was added and mixed to produce slurry, thereby producing particles having the average diameters indicated in Table 1 using a spray dryer.

A press-molding die illustrated in FIG. 2 provided with a die including four cavities was prepared, and press-molding was performed using the pelletized powder described above, thereby producing the molded bodies having the average diameters (diameter $D_A$ on lower punch side and diameter $D_B$ on upper punch side) indicated in Table 1. Regarding the molded body of sample No. 6, the die was changed to another die having a length of 30 mm. In the table, the lowering amounts of the upper punch by the additional load after pressurizing were simply indicated as lowering amount. In order to evaluate stability in the press-molding, one hundred molded bodies were produced, and whether or not a disadvantage such as damage to the punch was caused was determined. The molded bodies were fired at 1,350° C. in vacuo, thereby forming the blanks.

In the longitudinal direction of the obtained blank, dimensions of diameters of the one end A and the other end B, and the minimum diameter of the central portion C were measured and listed in Table 2 ($d_A$, $d_B$, $d_C$). The lengths of the blanks in the longitudinal direction were 8 mm excluding the sample No. 6, and aspect ratios ($8/d_A$) were also listed in Table 1. Structures of the cemented carbide were observed at a magnification of 5,000 times using a scanning electron microscope (SEM), and the average diameters of the WC grains in the one end A, the other end B, and the central portion C were calculated through a LUZEXR analysis method. The results were indicated in Table 2. Since the average diameters of the WC grains in both the one end A and the other end B were the same with each other, lists of the average diameters of the WC grains in the other end B were omitted.

The drill was produced using the blank, and drilling tests were carried out under the conditions described below. The results were indicated in Table 2.

(Conditions of Drilling Test)
Material to be Cut: FR-4 lamella, FR-6 lamella; thickness of 1.6 mm; double layered
Drill Shape: undercut-type of ϕ0.3 mm
Number of Revolutions: 120 krpm
Feed Rate: 2.4 m/min
Item of Evaluation: the number of product successfully performed drilling (number).

TABLE 1

| Sample No. | Molding Conditions | | | Molded body | | | |
|---|---|---|---|---|---|---|---|
| | Average Diameter of Particles (μm) | Unevenness in Particle Size (μm) | Lowering Amount (mm) | $D_A$ (mm) | $D_B$ (mm) | $D_B/D_A$ | Molding State |
| 1 | 100 | 80 | 1.0 | 1.30 | 1.30 | 1.00 | stably molded |
| 2 | 120 | 75 | 1.5 | 1.00 | 0.97 | 0.97 | stably molded |
| 3 | 130 | 90 | 1.0 | 1.50 | 1.50 | 1.00 | stably molded |
| 4 | 150 | 70 | 0.5 | 2.46 | 2.35 | 0.96 | stably molded |
| 5 | 120 | 60 | 2.0 | 2.10 | 2.10 | 1.00 | stably molded |
| 6 | 60 | 75 | 2.0 | 10.00 | 10.00 | 1.00 | stably molded |
| 7 | 200 | 80 | 1.0 | 1.30 | 1.20 | 0.92 | stably molded |
| 8 | 60 | 70 | 1.0 | 1.30 | 1.30 | 1.00 | Damage to lower punch |
| 9 | 100 | 120 | 1.0 | 1.00 | 1.00 | 1.00 | stably molded |
| 10 | 120 | 80 | 3.0 | 1.06 | 1.05 | 0.99 | stably molded |
| 11 | 120 | 80 | 0.0 | 1.06 | 1.03 | 0.97 | stably molded |
| 12 | 120 | 70 | 1.5 | 2.50 | 2.40 | 0.96 | stably molded |

TABLE 2

| Sample No. | Blank | | | | | | Average Diameter of Particles of Cemented Carbide | | Number of Processed Blanks (number) |
|---|---|---|---|---|---|---|---|---|---|
| | $d_A$ (mm) | $d_C$ (mm) | $d_B$ (mm) | $d_B/d_A$ | $d_C/d_A$ | Aspect Ratio[1] | A(μm) | C(μm) | |
| 1 | 1.05 | 1.03 | 1.04 | 0.994 | 0.984 | 7.64 | 0.35 | 0.33 | 5,300 |
| 2 | 0.81 | 0.79 | 0.80 | 0.988 | 0.975 | 9.88 | 0.37 | 0.35 | 4,500 |
| 3 | 1.22 | 1.21 | 1.22 | 0.998 | 0.990 | 6.54 | 0.34 | 0.31 | 5,000 |
| 4 | 2.00 | 1.97 | 2.00 | 1.000 | 0.985 | 4.00 | 0.32 | 0.32 | 4,000 |
| 5 | 1.72 | 1.67 | 1.68 | 0.976 | 0.970 | 4.65 | 0.32 | 0.31 | 4,100 |
| 6 | 8.10 | 8.03 | 8.10 | 1.000 | 0.991 | 3.70 | 0.29 | 0.29 | Not produceable |
| 7 | 1.05 | 0.94 | 1.02 | 0.969 | 0.893 | 7.60 | 0.32 | 0.29 | 2,200 |
| 8 | 1.05 | 0.97 | 1.03 | 0.984 | 0.927 | 7.64 | 0.42 | 0.42 | 3,700 |
| 9 | 0.81 | 0.72 | 0.80 | 0.988 | 0.889 | 9.88 | 0.32 | 0.28 | 2,600 |
| 10 | 0.86 | 0.76 | 0.82 | 0.955 | 0.885 | 9.32 | 0.32 | 0.28 | 2,800 |
| 11 | 0.89 | 0.82 | 0.82 | 0.921 | 0.921 | 8.99 | 0.33 | 0.27 | 2,700 |
| 12 | 2.00 | 1.97 | 1.99 | 0.995 | 0.985 | 4.00 | 0.33 | 0.31 | 4,300 |

[1]Aspect Ratio: a ratio of the length to the diameter $d_A$ of one end of the drill blank According to Tables 1 and 2, in the sample No. 6 of which $d_A$ exceeds 2 mm, the diameter of the blank was excessively large and causes an excessive grinding portion so that processing of the drill was not realistic and the producing of the drill was abandoned. The sample No. 8 of which the average diameter of the particles was smaller than 100 μm has failed to stably perform the press-molding, resulting in damage to the lower punch, and the producing of the drill blank was abandoned in the middle of producing. Moreover, regarding the sample No. 7 of which the average diameter of the particles was larger than 150 μm, the sample No. 9 which was molded with a base material having unevenness in particle size equal to or larger than 100 μm, and the sample No. 10 of which the lowering amount of the additional load by the upper punch after pressurizing exceeded 2 mm, $d_C/d_A$ became smaller than 0.9 and the number of processed blanks were a few. A cause thereof was considered to be structural unevenness of the sintered compact. Regarding the sample No. 11 to which the additional load was not applied by the upper punch after pressurizing, $d_B/d_A$ became smaller than 0.96, and thus, precision in brazing was deteriorated when performing the brazing.

In contrast, regarding the samples No. 1 to 5 and 12 in which $d_A$ and $d_B$ were equal to or smaller than 2 mm, $d_A \geq d_B > d_C$, the ratio of the length L to $d_A$ was equal to or larger than 3, and $d_B/d_A$ is 0.96 to 1 and $d_C/d_A$ is 0.9 to 0.995, good blank were produced without damaging the lower punch.

REFERENCE SIGNS LIST

1 drill
2 blank (drill blank)
A one end
B the other end
C central portion
3 shank
5 cutting edge
6 flute groove forming portion
7 neck portion
8 body
$d_A$ diameter of one end A side
$d_B$ diameter of the other end B side
$d_C$ minimum diameter of central portion
$D_A$ diameter of molded body on lower punch side
$D_B$ diameter of molded body on upper punch side

The invention claimed is:

1. A drill comprising:
a longitudinally extending processing section including tungsten carbide (WC) grains having a generally homogeneous grain size in a transverse cross-section and comprising:
a first section comprising a cutting edge; and
a second section comprising a flute groove and located longitudinally rearward of the first section; and
wherein an average diameter of the WC grains in the first section is larger than an average diameter of the WC grains in the second section.

2. The drill according to claim 1,
wherein processing section further comprises a third section located longitudinally rearward of the second section,
an average diameter of WC grains in the third section is larger than an average diameter of the WC grains in the second section.

3. The drill according to claim 2,
wherein a lengths of the first section and the third section are defined to be within 10% with respect to the whole length of the drill.

4. The drill according to claim 2,
wherein the diameter of the third section is larger than a diameter of the second section.

* * * * *